United States Patent
Hasegawa (10) Patent No.: US 12,103,218 B2
(45) Date of Patent: Oct. 1, 2024

(54) METHOD FOR PRODUCING HOLLOW MOLDED ARTICLE AND INJECTION STRETCH BLOW MOLDING MACHINE

(71) Applicant: Aoki Technical Laboratory, Inc., Nagano (JP)

(72) Inventor: Kazuhide Hasegawa, Nagano (JP)

(73) Assignee: Aoki Technical Laboratory, Inc. (JP)

( * ) Notice: Subject to any disclaimer, the term of this patent is extended or adjusted under 35 U.S.C. 154(b) by 0 days.

(21) Appl. No.: 17/961,990

(22) Filed: Oct. 7, 2022

(65) Prior Publication Data

US 2023/0118659 A1    Apr. 20, 2023

(30) Foreign Application Priority Data

Oct. 18, 2021 (JP) ................................ 2021-170110

(51) Int. Cl.
*B29C 49/06* (2006.01)
*B29C 49/12* (2006.01)
(Continued)

(52) U.S. Cl.
CPC .............. *B29C 49/06* (2013.01); *B29C 49/12* (2013.01); *B29C 49/22* (2013.01);
(Continued)

(58) Field of Classification Search
CPC ..... B29C 49/06; B29C 49/6604; B29C 49/12; B29C 49/22; B29C 2049/6606;
(Continued)

(56) References Cited

U.S. PATENT DOCUMENTS 3,979,491 A * 9/1976 Zavasnik ............ B29C 49/6409
425/526
5,290,506 A  3/1994 Yokobayashi
(Continued)

FOREIGN PATENT DOCUMENTS

CN       110662642 A      1/2020
DE    102008047891 A1     3/2010
(Continued)

OTHER PUBLICATIONS

Japan Patent Office, Notice of Reasons for Refusal, for corresponding Japanese Application No. 2021-170110, , Dec. 14, 2022, Patent Examiner: Rie Takahashi, with English Translation attached, consisting of 6 pages.
(Continued)

*Primary Examiner* — Monica A Huson
(74) *Attorney, Agent, or Firm* — Weisberg I.P. Law, P.A.

(57) ABSTRACT

When a preform having been molded while released from a mold at an earlier timing in an injection stretch blow molding machine is stretched and blow molded, the bottom of the preform is prevented from rupturing and the bottom of a hollow molded article is prevented from being uneven in wall thickness to produce such a hollow molded article without defect bottom by the injection stretch blow molding machine. An injection molding process of injection molding a preform; and a blow molding process of blow molding the preform to obtain a hollow molded article. The blow molding process allows a tip of a stretching rod cooled to a temperature between 50° C. and 90° C. to be brought into contact with the bottom of the preform in a softened state, and to press down the bottom of the preform while the bottom is cooled.

2 Claims, 7 Drawing Sheets

(51) Int. Cl.
  *B29C 49/22* (2006.01)
  *B29C 49/64* (2006.01)
  B29C 49/02 (2006.01)
  B29L 31/00 (2006.01)

(52) U.S. Cl.
  CPC .... *B29C 49/6604* (2022.05); *B29C 2049/023* (2013.01); *B29C 2049/6606* (2022.05); *B29C 2949/3034* (2022.05); *B29L 2031/712* (2013.01)

(58) Field of Classification Search
  CPC ....... B29C 2949/3034; B29C 2049/023; B29L 2031/712
  See application file for complete search history.

(56) References Cited

U.S. PATENT DOCUMENTS

| | | | |
|---|---|---|---|
| 5,578,262 A * | 11/1996 | Marcus | B29C 49/064 264/537 |
| 8,608,471 B2 | 12/2013 | Blochmann et al. | |
| 11,065,801 B2 | 7/2021 | Nakazawa et al. | |
| 2002/0101010 A1* | 8/2002 | Vailliencourt | B29C 49/062 264/537 |
| 2011/0236524 A1 | 9/2011 | Blochmann et al. | |
| 2020/0147853 A1 | 5/2020 | Nakazawa et al. | |
| 2022/0161480 A1 | 5/2022 | Yumoto | |

FOREIGN PATENT DOCUMENTS

| | | |
|---|---|---|
| JP | 60061228 A | 4/1985 |
| JP | H05131528 A | 5/1993 |
| JP | 2004090425 A | 3/2004 |
| JP | 2006150823 A | 6/2006 |
| WO | 2020209287 A1 | 10/2020 |

OTHER PUBLICATIONS

Japanese Decision to Grant a Patent, dated Mar. 1, 2022 for Application No. 2021-170110, with English Translation attached, consisting of 6 pages.
Korean Office Action, issued Feb. 19, 2023, for corresponding Korean Patent Application 10-2022-0127631, consisting of 13 pages.
European Patent Office, Extended European Search Report issued Feb. 13, 2023 for corresponding European Application No. 22201367.4, consisting of 6 pages.
Canadian Intellectual Property Office, Canadian Office Action issued Dec. 16, 2022, for corresponding Canadian Patent Application 3,177,583, consisting of 5 pages.
Canadian Intellectual Property Office, Second Office Action for corresponding Application No. CA 3,177,583, dated May 16, 2023, 4 pages.
State Intellectual Property Office of the People's Republic of China, The First Office Action for corresponding Application No. CN 202211066002.1, dated Jun. 22, 2023, 3 pages.
State Intellectual Property Office of the People's Republic of China, Search Report for corresponding Application No. CN 202211066002.1, dated Jun. 21, 2023, 2 pages.

* cited by examiner

METHOD FOR PRODUCING HOLLOW MOLDED ARTICLE AND INJECTION STRETCH BLOW MOLDING MACHINE

CROSS-REFERENCE TO RELATED APPLICATION

This application claims priority to Japanese Patent Application No. 2021-170110, filed Oct. 18, 2021, entitled "METHOD FOR PRODUCING HOLLOW MOLDED ARTICLE AND INJECTION STRETCH BLOW MOLDING MACHINE", the entirety of which is incorporated herein.

FIELD

The present invention relates to a method for producing a hollow molded article and an injection stretch blow molding machine.

BACKGROUND

Injection stretch blow molding machines have been used to produce hollow molded articles such as synthetic resin bottles and cups.

Such an injection stretch blow molding machine includes an injection molding section, a blow molding section, and an ejection section. The injection molding section is configured to injection mold a preform with a molten resin injected from an injection apparatus. The blow molding section is configured to blow mold the preform, which has been injection molded by the injection molding section, into a hollow molded article such as a bottle or a cup. The ejection section is configured to eject the hollow molded article, which has been blow molded by the blow molding section, to the outside of the molding machine.

The injection molding section of the injection stretch blow molding machine has an injection molding mold which is constituted of an upper mold (injection core mold), a lower mold (injection cavity mold), and a lip mold. In addition, the lip mold is configured to support the injection molded preform so that the preform is conveyed from the injection molding section to the blow molding section.

The blow molding section has a blow molding mold which is constituted of blow molds, which are composed of split molds, and a lip mold corresponding to the blow molding section.

The blow molding section further includes a stretching rod configured to stretch the preform which has been disposed in the blow molding mold. The stretching rod depresses (presses down) the side (barrel) and the bottom of the preform to stretch the preform.

The blow molding section includes a blowing unit configured to blow blow air into the preform during the stretching of the preform using the stretching rod. The blowing unit inflates and presses the preform at the side and bottom thereof against the inner surface of the blow mold to shape the hollow molded article.

The hollow molded article molded by the blow molding section is still supported by the lip mold that constitutes a part of the blow molding mold, and is released from the blow molding mold to be transferred to the above-mentioned ejection section.

The lip mold then releases the hollow molded article. As a result, the hollow molded article located at the ejection section is ejected to the outside of the injection stretch blow molding machine. The lip mold having released the hollow molded article then moves to the injection molding section again.

In the injection stretch blow molding machine as described above, a preform which has been injection molded by the injection molding section is released, while being supported by the lip mold, and transferred to the blow molding section, and the preform then located in the blow molding section is stretched by the stretching rod and blow air is blown at the same time to produce a hollow molded article.

When a preform for the hot parison system is injection molded, the wall thickness of the bottom of the preform is molded to be thinner than the wall thickness of the side of the preform in order to prevent the stretching rod from bursting through the bottom of the preform.

This is because, as disclosed in Patent Literature 1, even when the bottom and the side of the preform, which is made of the molten resin filled in the injection molding mold, are cooled at the same temperature and for the same time in the injection molding mold, the bottom is cooled more quickly than the side due to the difference in wall thickness and becomes a semi-solidified state.

The thickness of the bottom of the preform is set to ½ of the thickness of the side of the preform as a standard thickness.

In a case where the side of a preform has a reduced thickness, for example, a preform has a side with a thickness of less than 2.0 mm, if the bottom is designed with a thickness of less than 1.0 mm, flow orientation tends to occur during injection molding of the preform, and the bottom becomes whitened. In addition, there is also a problem in which a whitened portion remains at the bottom of a hollow molded article after blow molding.

As a measure to prevent flow orientation from occurring, the thickness of the bottom can be set to ½ or more of the thickness of the side of the preform which is 2.0 mm or less.

However, in this case, the bottom of the preform becomes softer than the side thereof by the greater thickness of the bottom of the preform. As a result, a phenomenon occurs in which the bottom is over stretched during stretching and is ruptured by the stretching rod.

In other words, when a preform is injection molded under conditions where the thickness of the side of the preform is about 2 mm and where injection molding of the preform is performed while injection cooling is performed for a normal period (time) in the injection molding section, immediately after releasing the preform, the extent of solidification of the side of the preform by the action of the injection cooling is greater.

Therefore, if the preform is released and stretched and blown in the blow molding section, the bottom of the preform is stretched first, continuously, and is ruptured by the stretching rod.

As a measure to suppress the phenomenon in which the preform ruptures during blow molding, a refrigerant (e.g., water) kept at predetermined temperatures is circulated through a cooling circuit, which is provided so as to pass through the tip of the stretching rod.

With this method, the cooled tip of the stretching rod comes into contact with the bottom of the preform during stretching, and cools the bottom. As a result, rupture of the preform can be suppressed.

Patent Literature 1 also describes that a cooling circuit is allowed to pass through the tip of a stretching rod and the bottom of a preform is cooled at the tip of the stretching rod, and that a refrigerant at temperatures between 15° C. and 27°

C. is allowed to pass through the cooling circuit. Furthermore, Patent Literature 1 describes that the bottom of the preform is cooled at the tip of the stretching rod to become a semi-solidified state for stretch blow molding.

PRIOR ART LITERATURE

Patent Literature 1: Japanese Patent Application Laid-Open No. 2004-090425

SUMMARY

Technical Problem

However, for example, in the method of cooling the bottom of the preform by the tip of the stretching rod through which the refrigerant at temperature between 15° C. and 27° C. passes, the side of the preform tends to stretch more easily than the bottom thereof at the time of blow molding. Therefore, there has been a disadvantage in which the thickness of the bottom of the resulting hollow molded article becomes thicker than the side thereof.

Patent Literature 1 mentions, as a measure to prevent rupture of the bottom of a preform, that the bottom thereof should be molded thicker at the time of blow molding of the product. As a specific method thereof, described is a method in which the tip of the stretching rod whose temperature is adjusted from 30° C. to 80° C. is brought into contact with the bottom of the preform.

However, in this method, cooling of the bottom is performed by bringing the tip member of the stretching rod into contact with the bottom of the preform and the subsequent inner wall of the side (barrel) of the preform to control the temperature of the bottom to a low temperature. In this case, since portions up to the inner wall of the side connected to the bottom of the preform are positively cooled, a portion which is not directly subjected to the pressing force of the tip member is also unnecessarily cooled, which hinders stretching around the bottom and causes the thickness of the bottom of a resulting container to be uneven.

Incidentally, in recent years, in the injection stretch blow molding machine, in order to shorten the molding cycle of preforms and hollow molded articles, the timing of releasing the preform from the injection molding mold has been made earlier.

However, at present, in the injection stretch blow molding machine of the type in which the timing of releasing preforms from the injection molding mold is made earlier to mold the preforms, a cooling unit is not provided to the stretching rod of the blow molding section.

And, in the blow molding process, the tip of the stretching rod is brought into contact with the bottom of the preform without cooling conducted by the stretching rod as discussed above, and the side is stretched while the bottom is pressed down by the lowering of the stretching rod.

In an injection stretch blow molding machine of the type in which preform is released at a quicker release timing, the molding cycle of the preforms is short as described above.

Therefore, compared with the blow molding process of the injection stretch blow molding machine of the type in which the timing of releasing preforms from the mold is not made to be earlier, the number of times per unit time that the tip of the stretching rod is in contact with the bottom of the preform increases.

As a result, after the stretching rod has stretched the preform and before the tip of the stretching rod heated by the preform stretching has returned to the set temperature, the stretching rod stretches the preform which has been conveyed next. Thus, the temperature of the tip of the stretching rod gradually increases by this action.

Therefore, when the preform that has been released from the mold at a quicker timing and transferred to the blow molding mold, the tip of the stretching rod whose temperature is still increased presses down the bottom of the preform. This may cause the bottom to over stretch prior to stretching of the side of the preform and may cause tearing.

In view of the above-mentioned problems, it is an object of the present invention to provide a method for producing a hollow molded article and an injection stretch blow molding machine which prevent the bottom of a preform from rupturing when the preform is stretched and blown and prevent the wall thickness of the bottom of the hollow molded article from becoming uneven.

Solution to Problem

The present invention has been made in consideration of the aforementioned problems, and according to an aspect of the present invention, provided is a method for producing a hollow molded article including:
  an injection molding process of injection molding a preform with an injection molding mold; and
  a blow molding process of blow molding the preform with a blow molding mold to obtain a hollow molded article, wherein
  the injection molding process includes an injection cooling process of allowing the preform to be brought into contact with the injection molding mold to solidify a surface layer of the preform;
  further includes a preform conveyance process of releasing the preform from the injection molding mold and conveying the preform to the blow molding mold with the preform being in a state in which the surface layer of the preform is softened by receiving heat from an inner layer of the preform;
  the blow molding process allows a tip of a stretching rod cooled to a temperature ranging from 50° C. to 90° ° C. to be brought into contact with a bottom of the preform conveyed to the blow molding mold in a softened state in which a temperature of the surface layer of the preform is raised by receiving the heat from the inner layer of the preform in the preform conveyance process of the injection molding process, and to press down the bottom of the preform while the bottom is cooled. Thus, the aforementioned problems can be solved.

In the present invention, it is preferable to cool the tip of the stretching rod to a temperature ranging from 70° C. to 90° C.

Furthermore, according to another aspect of the present invention, provided is an injection stretch blow molding machine including:
  an injection molding section in which an injection molding mold is disposed, for use in injection molding a preform; and
  a blow molding section that includes a stretching rod configured to stretch the preform which has been injection molded by the injection molding section, where a blow molding mold for blow molding a hollow molded article is disposed, wherein
  the injection molding section is a section configured to perform
    an injection cooling process of allowing the preform to be brought into contact with the injection molding mold to solidify a surface layer of the preform, and a preform conveyance process of releasing the preform from the injection molding mold and conveying the preform to the blow molding mold with the preform being in a state in which the surface layer of the preform is softened by receiving heat from an inner layer of the preform, the blow molding section is a section configured such that the preform released from the injection molding mold is disposed in the blow molding mold with the preform being in a state in which the surface layer of the preform is softened by receiving heat from an inner layer of the preform, the stretching rod includes a cooling unit configured to cool a tip of the stretching rod, which is allowed to be in contact with a bottom of the preform, at a temperature ranging from 50° ° C. to 90° ° C. with the preform being conveyed from the injection molding mold to the blow molding mold in a softened state in which a temperature of the surface layer of the preform is raised by receiving the heat from an inner layer of the preform. Thus, the aforementioned problems can be solved.

In the present invention, it is preferable to cool the tip of the stretching rod to a temperature ranging from 70° C. to 90° C.

Advantageous Effects of Invention

The preform just injection molded in the injection molding section of the injection stretch blow molding machine has a soft bottom. According to the present invention, however, the rupture phenomenon of the preform, which has occurred when stretching and blowing are performed in the blow molding section, can be suppressed by the provision of the cooling unit including a cooling circuit for circulating a refrigerant of 50° C. to 90° C. at the tip of the stretching rod.

If the temperature of the tip of the stretching rod becomes high, the bottom of the preform is easily stretched. For example, as in the injection stretch blow molding machine of the type which makes the timing of releasing the preform from the injection molding mold earlier, the injection cooling time can be set shorter to adjust the balance of stretching between the side and the bottom of the preform, so that the wall thickness of the hollow molded articles are not varied.

DETAILED DESCRIPTION

Figure 1:
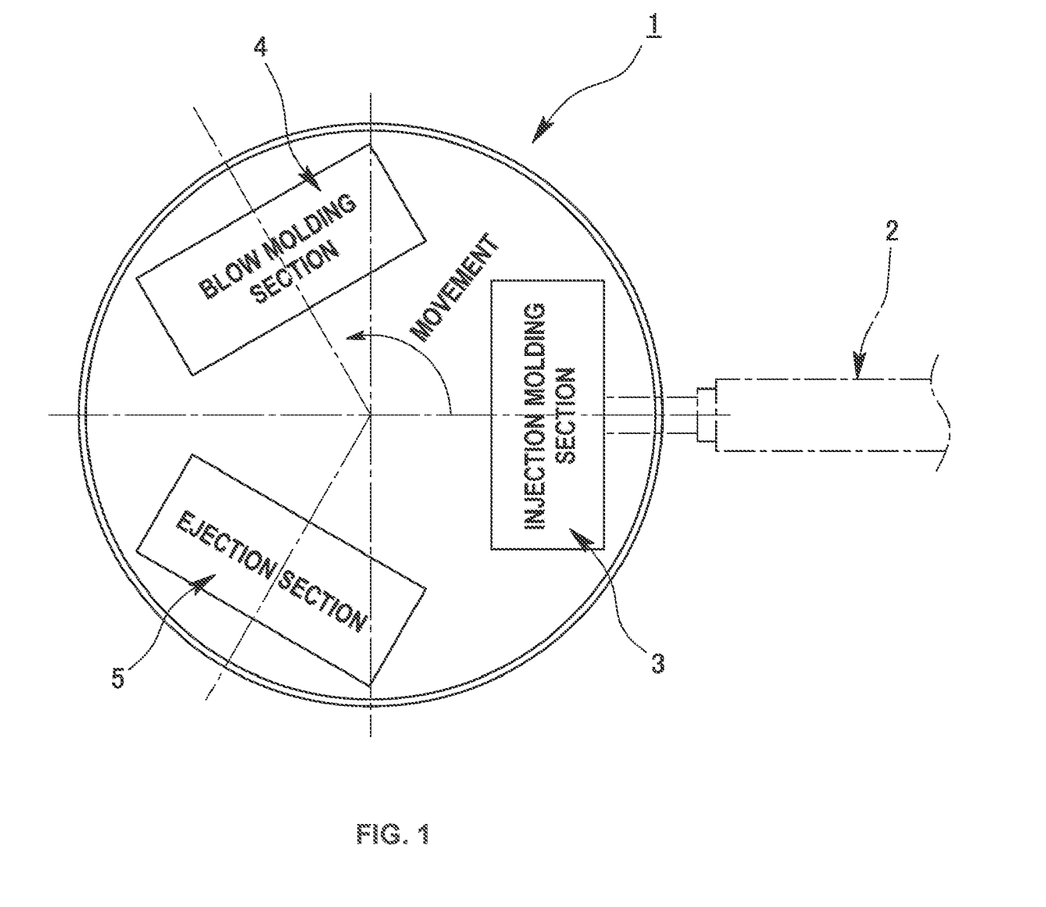
FIG. 1 is an explanatory view schematically illustrating an injection stretch blow molding machine according to the present invention.

The present invention will next be described in detail on the basis of embodiments illustrated in the drawings. FIG. 1 illustrates an injection stretch blow molding machine 1 that implements the present invention. The injection stretch blow molding machine 1 includes:

an injection molding section 3 configured to inject mold a preform by supplying a molten resin from an injection apparatus 2;

a blow molding section 4 configured to stretch the preform, which has been injection molded by the injection molding section 3, and to blow mold a hollow molded article by blowing blow air into the preform; and an ejection section 5 configured to eject the hollow molded article, which has been blow molded by the blow molding section 4, to the outside of the injection stretch blow molding machine 1.

The injection molding section 3, the blow molding section 4, and the ejection section 5 are located at respective positions at constant angular intervals in the rotation direction of a not-illustrated rotary plate with lip molds. An arrow in FIG. 1 shows the rotation direction of the rotary plate and the transferring direction of the lip molds.

The rotation of the rotary plate is able to position the lip molds directly above the respective, injection molding section 3, blow molding section 4, and ejection section 5. Then, the lip molds repeat rotation at a constant rotation angle and ascending/descending actions. By doing so, the preform is transferred from the injection molding section 3 to the blow molding section 4 by the lip mold, and the hollow molded article is transferred from the blow molding section 4 to the ejection section 5. The lip mold at the ejection section 5 releases the hollow molded article, and the rotation of the rotary plate can return the lip mold, which has released the hollow molded article, to the injection molding section 3.

Injection Molding Section:

The injection molding section 3 has an injection molding mold which is constituted by combining the lip mold with an upper mold (injection core mold) and a lower mold (injection cavity mold). The lower mold, or both the lower and upper molds are provided with a cooling circuit for circulating a refrigerant adjusted to a predetermined temperature. A molten resin is injection molded with the injection molding mold, in which the upper mold and the lower mold are closed and clamped under high pressure, and is brought into contact with the injection molding mold for cooling.

After that, the upper mold and the lower mold are opened, and the rotary plate ascends while the preform is supported by the lip mold. Furthermore, the rotary plate rotates so that the transfer of the lip molds allows the preform to be transferred to the blow molding section 4.

Blow Molding Section:

The blow molding section 4 has a blow molding mold which is constituted by combining the lip mold with blow molds which are composed of paired split molds. In addition, the blow molding section 4 includes a stretching rod configured to enter the inside of the preform supported by the lip mold between the blow molds, and a blowing apparatus configured to supply blow air into the preform with pressure. Then, the preform is stretched by the stretching rod and blown with blow air to blow mold the hollow molded article.

The hollow molded article is released by the ascending action of the rotary plate while the blow molds are opened after blow molding, and the rotary plate rotates so that the hollow molded article, which is still supported by the lip mold, is transferred to the ejection section 5.

Ejection Section:

In the ejection section 5, the hollow molded article which is being held by the lip mold is released. Then, the hollow molded article detached from the lip mold is ejected to the outside of the injection stretch blow molding machine 1. Furthermore, the lip mold which has released the hollow molded article is transferred to the injection molding section 3 by the rotation of the rotary plate, so that it is incorporated into the injection molding mold as described above.

Method for Producing Hollow Molded Article:

Next, a method for producing a hollow molded article according to the present embodiment will be described. The method for producing a hollow molded article according to the present embodiment utilizes the above-mentioned injection stretch blow molding machine 1, and corresponds to a hollow molded article producing process 6 in which the lip molds are sequentially transferred to positions of the injection molding section 3, the blow molding section 4, and the ejection section 5 to produce the hollow molded article.

Figure 2:
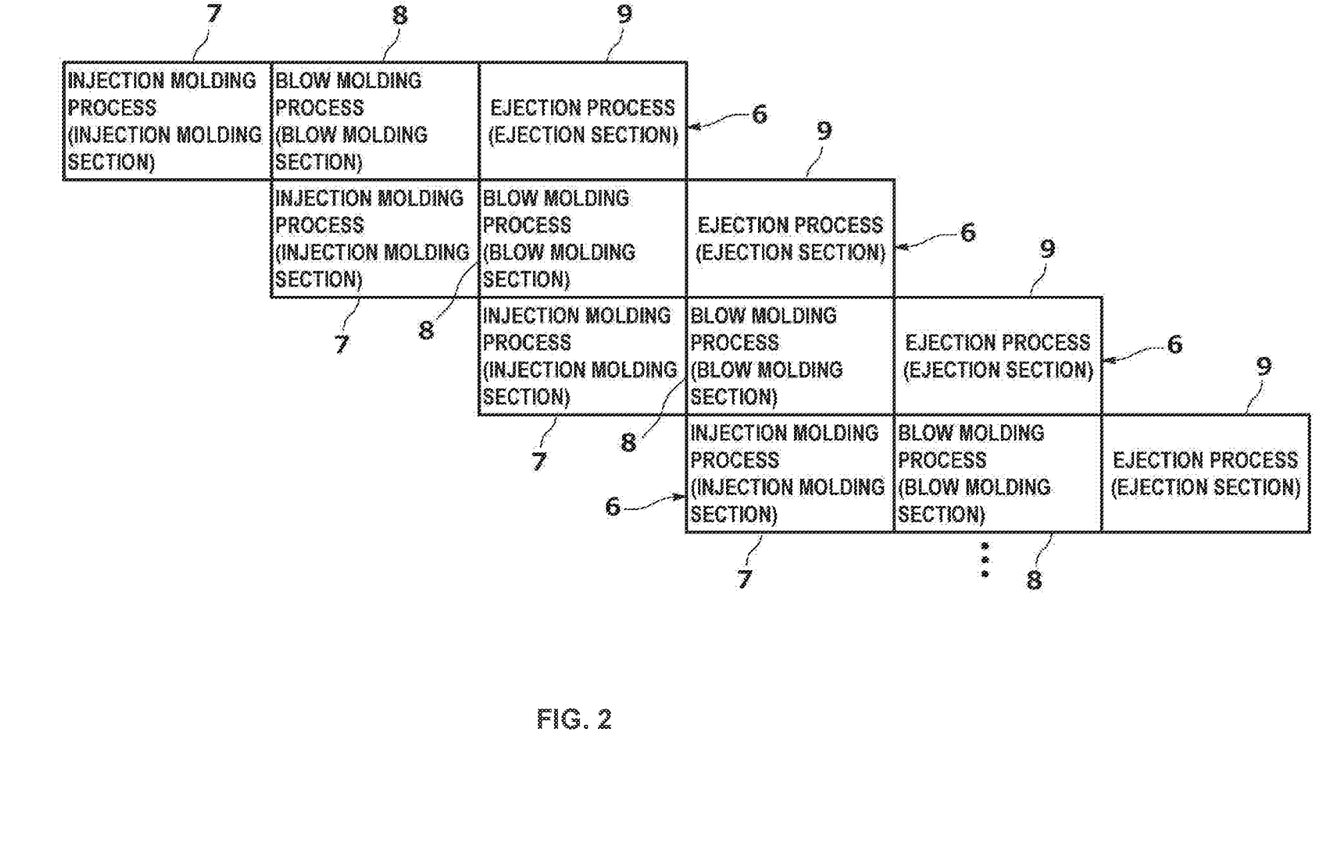
FIG. 2 is an explanatory view showing a state in which multiple hollow molded article producing processes in the injection stretch blow molding machine are shifted one stage behind the preceding process.

More specifically, the hollow molded article producing process 6 includes, as illustrated in FIG. 2, an injection molding process 7 for injection molding a preform in the injection molding section 3; a blow molding process 8 for blow molding a hollow molded article by stretching the preform, which has been molded in the injection molding process 7, and by blowing blow air thereinto in the blow molding section 4; and an ejection process 9 for ejecting the hollow molded article, which has been molded in the blow molding process 8, to the outside of the molding machine by releasing it from the lip mold in the ejection section 5.

Injection Molding Process:

The injection stretch blow molding machine 1 mentioned as the present embodiment is a molding machine configured to produce a cup-shaped wide-mouth hollow molded article. Furthermore, a preform for obtaining a cup-shaped hollow molded article is injection molded in a bowl shape with a lip portion having a wide opening.

Figure 3:
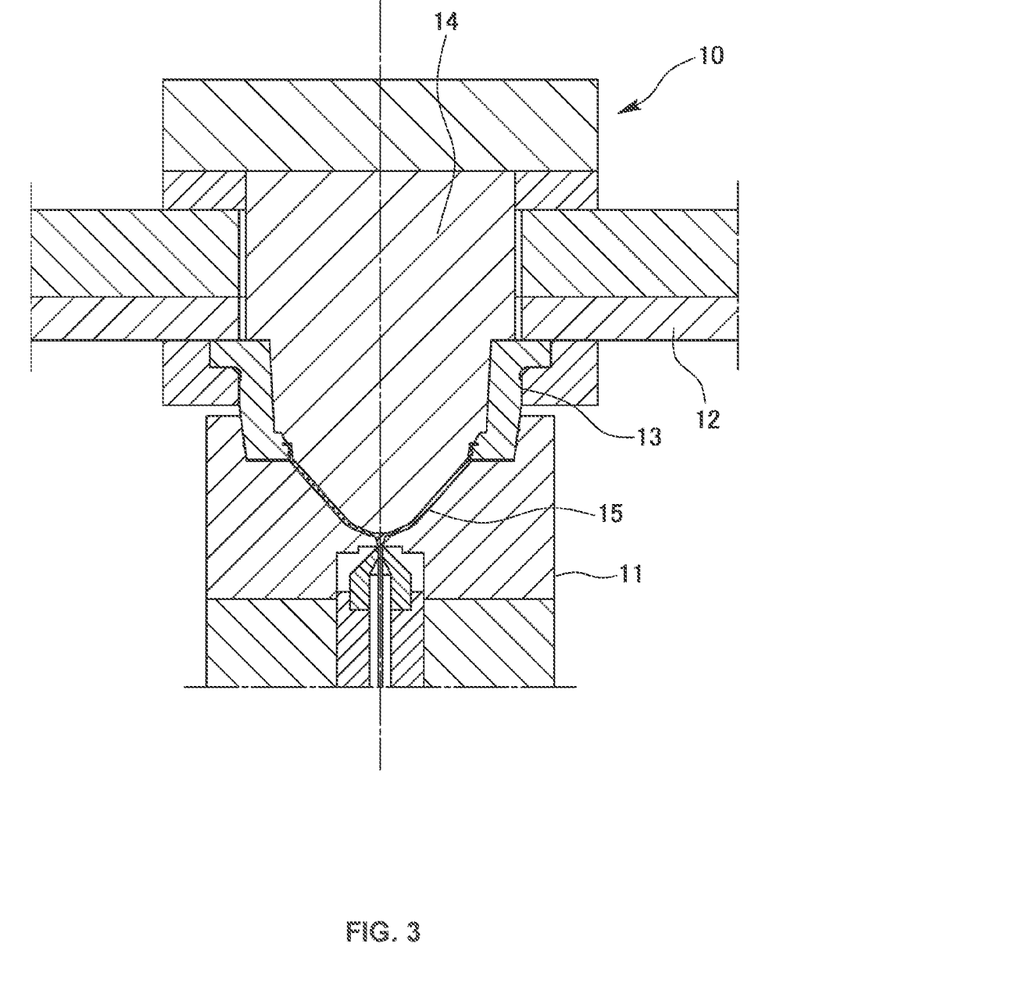
FIG. 3 is an explanatory view illustrating an example of an injection molding mold.

FIG. 3 shows an injection molding mold 10 for use in injection molding a bowl-shaped preform 15. The illustrated injection molding mold 10 includes a lower mold 11; a lip mold 13 which is assembled to a rotary plate 12 and is superimposed on the lower mold 11; and an upper mold 14 which is lowered so as to enter the lower mold 11 through the lip mold 13.

Figure 4:
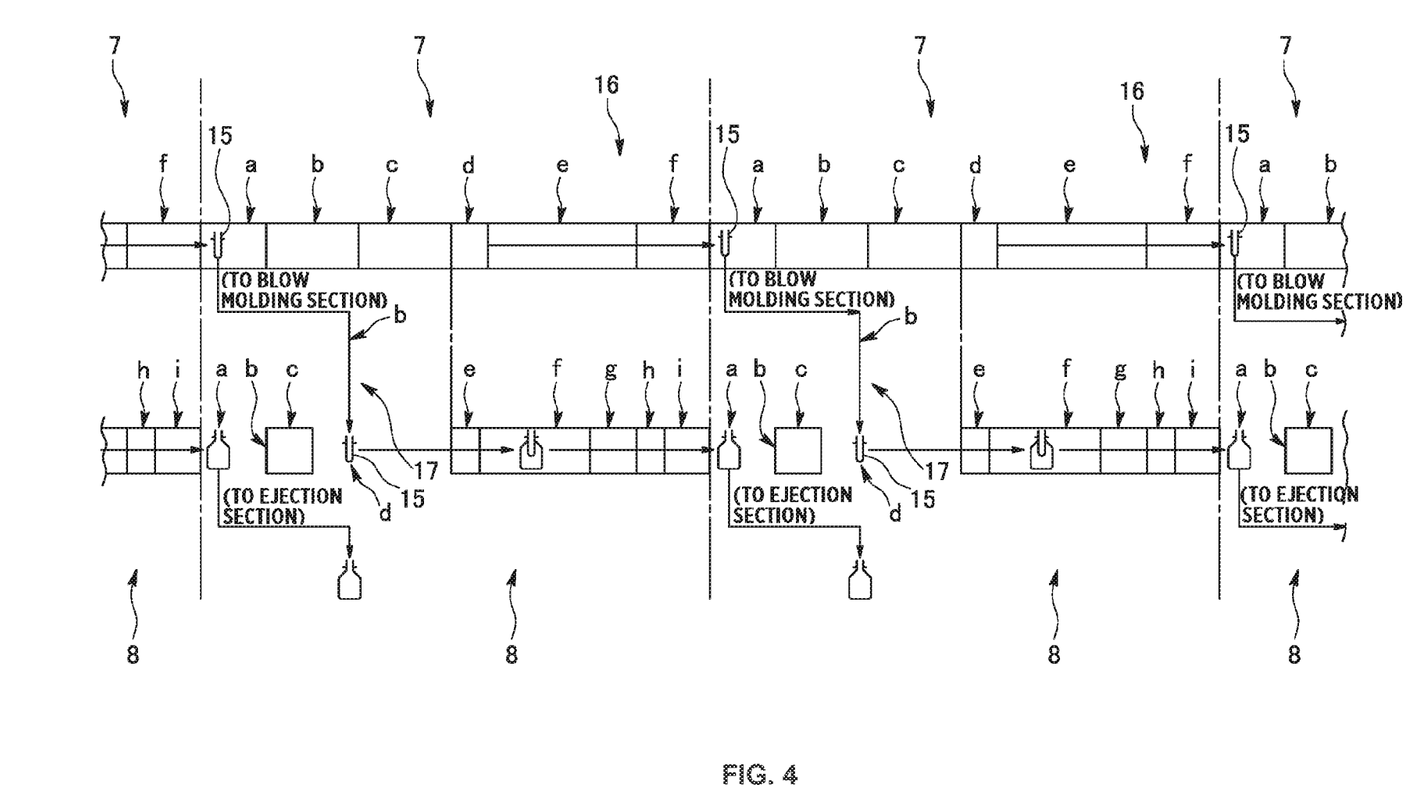
FIG. 4 is an explanatory view schematically illustrating a state in which the injection molding process and the blow molding process are repeated, respectively.

The injection molding process 7 repeated in the injection molding section 3 includes the following multiple steps (processes) (see FIG. 4):

(Reference sign a) a step of releasing the mold clamping force to release the preform 15 molded in the previous process, and of opening the injection molding mold 10;

(Reference sign b) a step of releasing the molded preform 15 while the rotary plate 12 ascends, and of conveying the molded preform 15 to the blow molding section 4 while the rotary plate 12 rotates, additionally, the lip mold 13 which was in the ejection section 5 is allowed to be located at the upper position of the lower mold 11 due to the rotation of the rotary plate 12;

Reference sign c) a step of lowering the upper mold 14 together with the rotary plate 12 so as to pass through the lip mold 13, and clamping the mold then switching the clamping force to a high pressure;

(Reference sign d) a step of ensuring the nozzle advance operation time of an injection apparatus;

(Reference sign e) an injection step of injecting a molten resin from the injection apparatus; and (Reference sign f) a cooling step.

Here, as described above, the lower mold 11 or both the lower mold 11 and the upper mold 14 are provided with a cooling unit (not illustrated) which has a cooling circuit for circulating the refrigerant into the mold, so that the lower mold 11 and the upper mold 14 are constantly cooled.

As described above, the injection molding process 7 includes an injection cooling process 16 consisting of the injection step e and the cooling step f. In the injection step e, the molten resin, which is supplied into a filling space portion of the injection molding mold 10, spreads over the entire filling space portion while being in contact with the inner surface of the injection molding mold 10, so that the set amount of the molten resin is filled in a pressurized state. In the cooling step f, after the supply of the molten resin is completed, the preform 15 is subsequently cooled from the inner surface side of the injection molding mold 10.

In this way, in the injection cooling process 16, after filling of the molten resin, the preform 15 in the molten state comes into contact with the injection molding mold 10 which is constantly cooled. As a result, a portion of the surface layer of the preform 15 is solidified.

At the time of the injection cooling process 16, the molten resin (in a softened state) in a high temperature is still present in the inner layer of the preform 15, and heat from the inner layer is transferred toward the surface layer.

In the injection stretch blow molding machine 1 according to the present embodiment, the timing of releasing the preform 15 from the injection molding mold 10 is made earlier. Of course, the time for the injection cooling process 16 is ensured until the hardness of the preform, where the shape of the preform does not collapse in the middle of being conveyed to the blow molding section 4, is ensured.

Preform Conveyance Process:

Furthermore, the injection molding process 7 includes a preform conveyance process 17 of conveying the preform 15 which has been released from the injection molding mold 10 to the blow molding section 4.

Also in the preform conveyance process 17, the surface layer of the preform 15 is solidified, and the shape of the preform 15 is maintained. However, since the mold is released at an early stage, the preform 15 is not yet cooled from the injection molding mold 10, but heat from the inner layer is transferred to the surface layer to raise the temperature of the surface layer and soften the surface layer while being conveyed to the blow molding section 4. As shown in FIG. 4, each time the molten resin is injected into the injection molding mold 10, the injection molding process 7 is repeated in the injection molding section 3.

Figure 5:
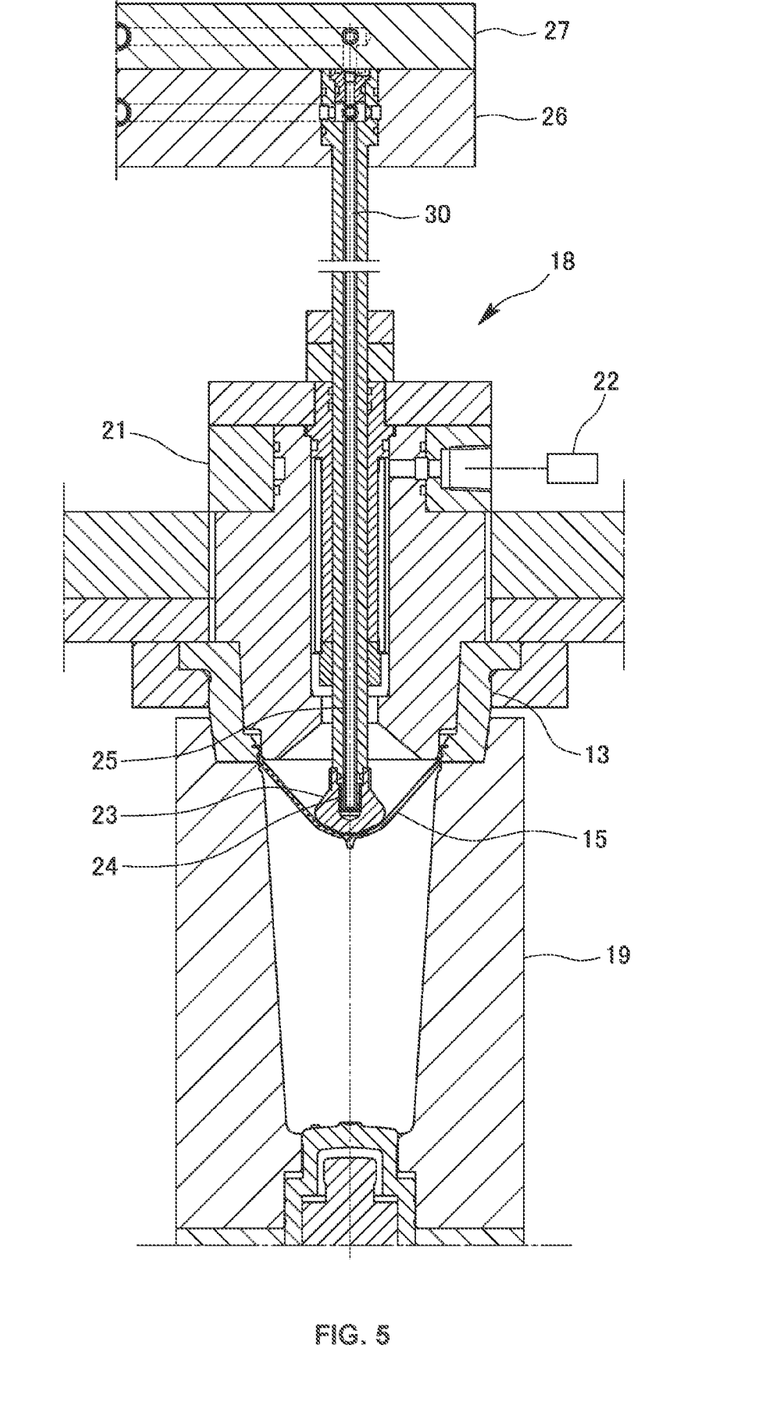
FIG. 5 is an explanatory view illustrating an example of a blow molding mold.

Blow Molding Process:

FIG. 5 shows a blow molding mold 18. In the blow molding mold 18, the lip mold 13, which has been transferred to the blow molding section 4, overlaps above the paired blow molds 19 which are closed. Furthermore, the blow core mold 21 which supports the stretching rod 20 is superimposed on the lip mold 13, and the stretching rod 20 is lowered toward the bottom of the blow molds 19 through the lip mold 13. The blow core mold 21 is provided with a supplying unit 22 configured to supply blow air so as to pass around the stretching rod 20.

To the blow molding section 4 where the blow molding mold 18 is disposed, the lip mold 13 attached to the rotary plate 12 transfers the preform 15 in the preform conveyance process 17, and the blow molding mold 18 is then clamped. At this time, the stretching rod 20 supported by the blow core mold 21 enters the inside of the preform 15. The blow molding process 8 also includes the following multiple steps (processes) (see FIG. 4):

(Reference sign a) a step of conveying the hollow molded article from the opened blow molds 19 to the ejection section 5;
(Reference sign b) a mold closure starting step of starting closing the opened blow molds 19;
(Reference sign c) a clamping step for the blow molds 19;
(Reference sign d) a preform disposing step of disposing the preform 15;
(Reference sign e) a step of overlaying the blow core mold 21 and switching the clamping force to a high pressure;
(Reference sign f) a molding step of lowering the stretching rod 20 from the blow core mold 21 to stretch the preform 15, and blowing blow air into the preform 15 to blow mold a hollow molded article (the stretching rod 20 returns to a standby position when descending a predetermined length, and the supply of the blow air is stopped after blowing a predetermined amount of blow air);
(Reference sign g) a discharging step of discharging the blow air from the inside of the hollow molded article which has been molded by the blow molding mold 18;
(Reference sign h) a blow mold pressure release step of releasing the clamping force applied to the blow molding mold 18; and
(Reference sign i) a blow mold opening step of opening the blow molding mold 18.

More specifically, the blow molding process 8 in the blow molding section 4 includes, first, the above-mentioned step a of conveying the hollow molded article, which has been blow molded in a preceding process, toward the ejection section 5, the mold closure starting step b for the blow molds 19, and the clamping step c for the blow molds 19.

Furthermore, by the operation of the rotary plate 12 at this time, the preform 15, which has been injection molded in the injection molding process 7, is positioned above the blow molds 19 while being supported by the lip mold, and the preform 15 is disposed between the blow molds 19 by descending action of the rotary plate 12 (step d).

Furthermore, when the preform 15 is disposed in the blow molds 19, through the step e in which the clamping force for the blow molds 19 is switched to a high pressure, the blow core mold 21 is lowered, so that the stretching rod 20 is located directly above the preform 15. Then, the stretching rod 20, which is lowered, stretches the preform 15 while pressing down the bottom of the preform 15. In addition, the blowing apparatus blows air into the preform 15 to blow mold the hollow molded article (step f).

After that, the blow air is discharged to bring the interior of the hollow molded article to atmospheric pressure, and the clamping force applied to the blow molding mold 18 is reduced to open the blow molding mold 18 (steps g, h, and i).

Stretching Rod:

In the injection stretch blow molding machine 1 according to the embodiment, a cooling unit 24 is provided at a tip (lower end portion) 23, formed of a metal material, of the stretching rod 20 in the blow molding section 4. The cooling unit 24 cools the tip 23 so that the bottom of the preform 15 which is in contact therewith is cooled. This prevents the bottom from rupturing during stretching while suppressing softening of the bottom, and also stretches the side of the preform 15 by pressing down the bottom which does not rupture.

Figure 6:
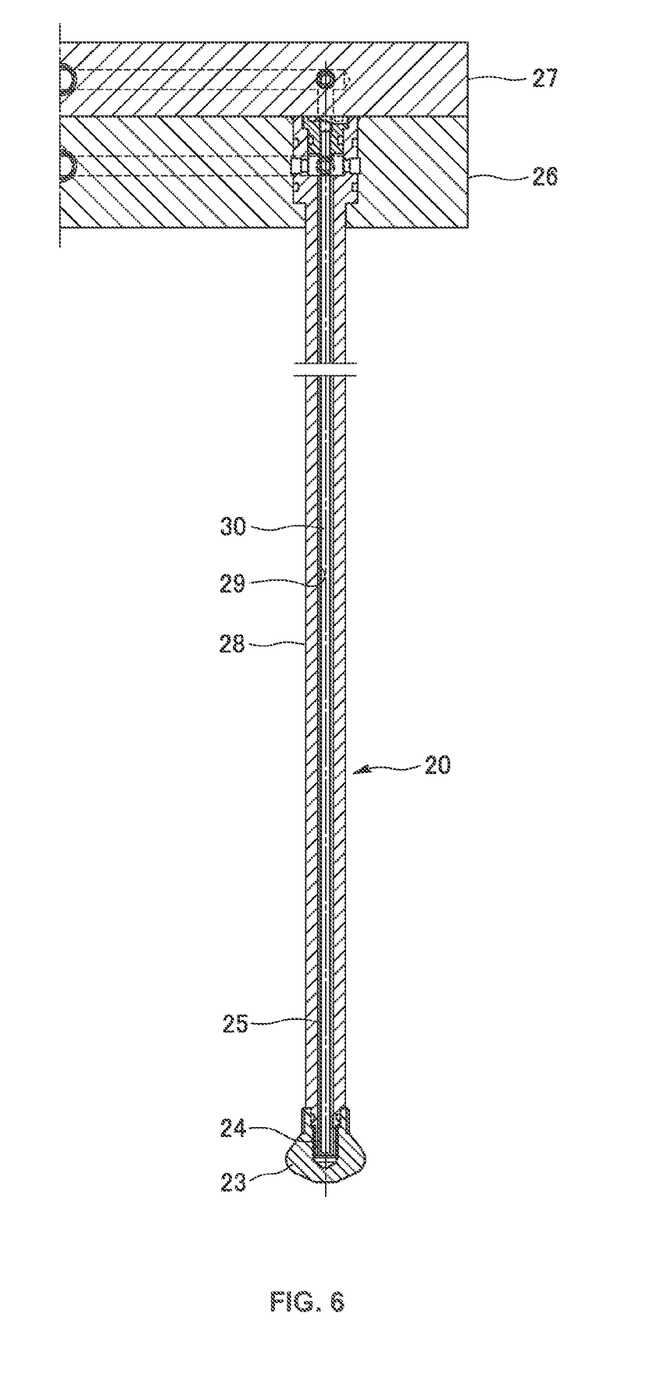
FIG. 6 is an explanatory view illustrating a cross section of a stretching rod.

The cooling unit 24 includes a cooling circuit 25 which passes through the interior of the tip 23 of the stretching rod 20 as illustrated in FIG. 6. A refrigerant at 50° C. to 90° C. is allowed to flow through the cooling circuit 25 to cool the bottom of the preform 15 each time the tip 23 comes into contact with the bottom.

As illustrated, a return pipe line connected to a refrigerant source is provided within a rod support plate 26 with the stretching rod 20 attached, and a supply pipe line from the refrigerant source is provided within a mounting plate 27 overlapping the upper surface of the rod support plate 26.

Furthermore, as illustrated in FIG. 6, a rod body 28 of the stretching rod 20, which is supported by the rod support plate 26, is formed in a pipe shape. The cooling circuit 25 is formed by inserting a conduit 30, which communicates with the supply pipe line of the mounting plate 27, into an inner passage 29, which extends from the upper portion of the rod body 28 (from the rod support plate 26 side) to the lower portion (to the tip 23 side). In this configuration, a refrigerant is fed into the conduit 30 from the mounting plate 27 side, is passed through the tip 23, raised between the outer surface of the conduit 30 and the inner surface of the inner passage 29 to reach the return pipe line of the rod support plate 26, and returns from the return pipe line to the refrigerant source.

Here, it is preferable to adjust the temperature of the refrigerant passing through the cooling circuit 25 to a temperature ranging from 50° C. to 90° C. The refrigerant adjusted to the foregoing temperature range can suppress softening of the bottom of the preform 15 which is in contact with the tip 23 of the stretching rod 20. As a result, the bottom of the preform 15 is not over stretched. That is, the stretching of the bottom of the preform 15 is suppressed, and the side of the preform 15, which is not in contact with the stretching rod 20, is appropriately stretched, so that the rupture of the bottom can be prevented.

Furthermore, in the present embodiment, in order to make the release timing from the injection molding section 3 earlier, the injection cooling time of the preform 15 is shorter. Since the preform 15 in this state is transferred to the blow molding section 4, heat is transferred from the inner layer of the preform 15, which is still in the softened state at the time when the preform 15 is located inside the blow molding mold 18, to the surface layer, so that the side of the preform 15 is in a state which is ready to be stretched. Thus, when the tip 23 of the stretching rod 20 presses down the bottom of the preform 15, the entire side of the preform 15 is properly stretched. Therefore, the resulting hollow molded article has no large variation in wall thickness in the bottom circumferential direction because the bottom is also appropriately stretched in the plane direction. Furthermore, it is more preferable to adjust the temperature of the refrigerant flowing through the cooling circuit 25 to a temperature ranging from 70° C. to 90° C.

In contrast, if the temperature of the refrigerant is below 50° C., there is a tendency for the variation in wall thickness in the bottom circumferential direction to increase, compared with a case with the above-mentioned temperature range. Furthermore, if the temperature of the refrigerant is above 90° C., since a relatively high temperature refrigerant is used, the bottom of the preform is softened. As a result, there is a tendency for the variation in wall thickness in the bottom circumferential direction to increase.

Ejection Process:

As shown in FIG. 2, when the blow molding process 8 is completed, the process proceeds to the ejection process 9. In the ejection process 9, the hollow molded article is pulled up from the blow molding mold 18 which is opened while being supported by the lip mold 13, and is transferred to the ejection section 5 by the rotation of the rotary plate 12. Then, after the rotary plate 12 stops, the lip mold 13 is opened to release the hollow molded article, which is then ejected to the outside of the molding machine.

After ejection of the hollow molded article to the outside of the molding machine is performed, the lip mold 13 is closed and the rotary plate 12 rotates to move toward the injection molding section 3, thereby completing the ejection process 9.

EXAMPLES

In the method for producing a hollow molded article described above, specific examples will be given below. However, the present invention is not limited or restricted by the following examples.

Molding Test of Hollow Molded Article:

Next, a test of molding a cup-shaped hollow molded article from a mortar-shaped preform was performed using an injection stretch blow molding machine 1 in which the releasing timing was made earlier by shortening the injection cooling time. The test conditions were as follows.

Test Conditions:

After passing the refrigerant (cooling unit 24) at the respective temperatures of 30° C., 40° C., 50° C., 60° C., 70° C., 80° C., and 90° C. through the tip 23 of the stretching rod 20, a preform 15 was blow molded using a blow molding section 4 provided with these stretching rods 20 to obtain a hollow molded article with a weight of 25.2 g. The sample using the refrigerant at 30° C. is referred to as Comparative Example 1, the sample using the refrigerant at 40° C. as Comparative Example 2, the sample using the refrigerant at 50° C. as Example 1, the sample using the refrigerant at 60° C. as Example 2, the sample using the refrigerant at 70° C. as Example 3, the sample using the refrigerant at 80° C. as Example 4, and the sample using the refrigerant at 90° C. as Example 5.

Figure 7:
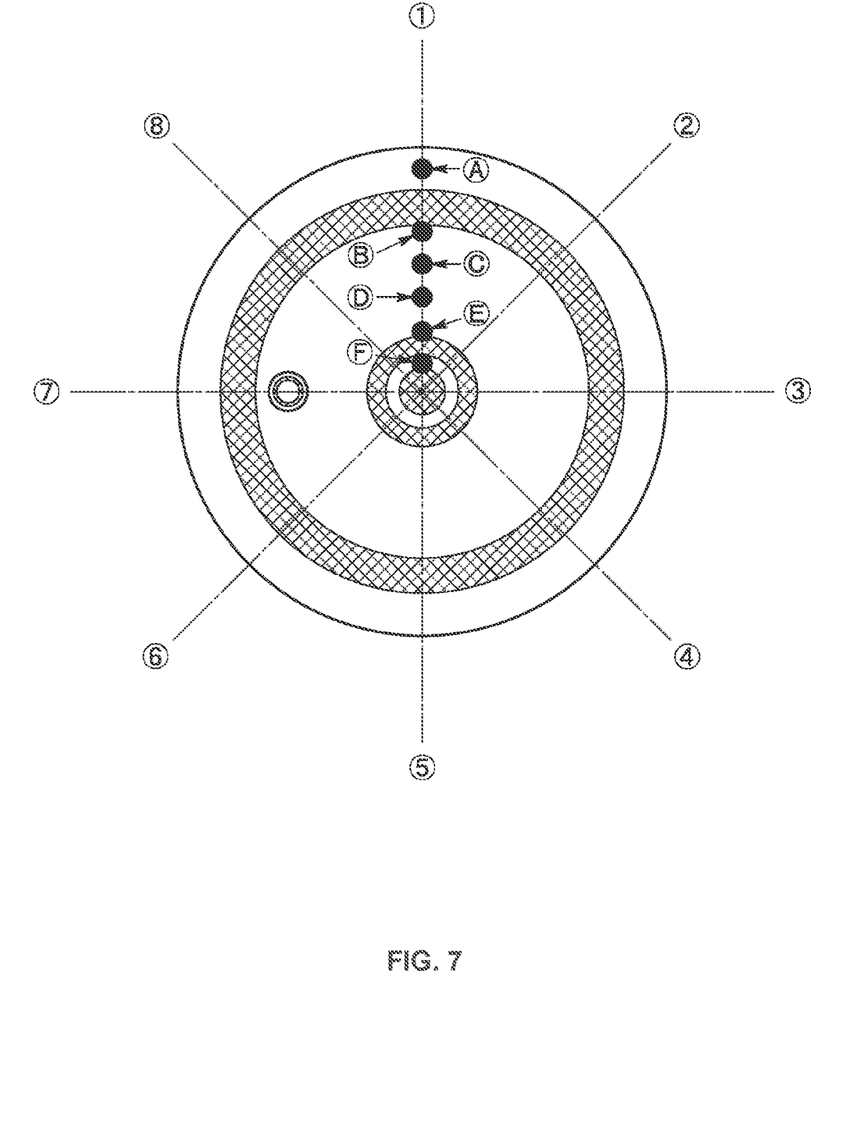
FIG. 7 is an explanatory view illustrating wall thickness measurement positions at the bottom of a hollow molded article.

FIG. 7 shows the wall thickness measurement positions of each sample. Here, FIG. 7 is a bottom view of a cup-shaped hollow molded article. The lines extending from the outside to the center of the bottom surface (bottom) of the hollow molded article are numbered 1 to 8. Line numbers 1 to 8 are numbered in clockwise order along the circumferential direction of the bottom surface (bottom) of the hollow molded article. Also, reference signs A to F in FIG. 7 are arranged along each line of numbers 1 to 8 (along the radial direction of the bottom surface of the hollow molded article). That is, by measuring the wall thickness of the A portions of the line numbers 1 to 8, the difference in wall thickness (variation in wall thickness) of the circumferential region connecting the A portions of all the line numbers can be known. The same applies to B to F portions. The measurement results are shown in Tables 1 to 7 below. The unit of length of the numerical values in each table are all mm (millimeter). A hatched portion at the center position in FIG. 7 is a gate position, and a hatched portion concentric to the center position is a rising inclined surface portion.

TABLE 1

Comparative Example 1 Unit: mm

| Line Number | 1 | 2 | 3 | 4 | 5 | 6 | 7 | 8 | Difference in Wall Thickness in Circumferential Direction |
|---|---|---|---|---|---|---|---|---|---|
| A portion | 0.38 | 0.39 | 0.43 | 0.39 | 0.33 | 0.37 | 0.37 | 0.36 | 0.10 |
| B portion | 1.13 | 1.07 | 1.14 | 1.04 | 0.94 | 1.00 | 1.00 | 1.01 | 0.20 |
| C portion | 0.94 | 0.78 | 0.96 | 0.78 | 0.69 | 0.75 | 0.78 | 0.81 | 0.27 |
| D portion | 0.77 | 0.86 | 1.09 | 1.05 | 0.99 | 1.00 | 0.97 | 0.75 | 0.34 |
| E portion | 1.16 | 1.21 | 1.21 | 1.17 | 1.13 | 1.21 | 1.24 | 1.17 | 0.11 |
| F portion | 0.88 | 0.87 | 0.94 | 0.91 | 0.98 | 0.97 | 0.89 | 0.88 | 0.11 |
| Average of Differences in Wall Thickness | | | | | | | | | 0.19 |

TABLE 2

Comparative Example 2 Unit: mm

| Line Number | 1 | 2 | 3 | 4 | 5 | 6 | 7 | 8 | Difference in Wall Thickness in Circumferential Direction |
|---|---|---|---|---|---|---|---|---|---|
| A portion | 0.34 | 0.36 | 0.41 | 0.40 | 0.31 | 0.36 | 0.32 | 0.31 | 0.10 |
| B portion | 0.90 | 0.88 | 0.97 | 0.87 | 0.82 | 0.89 | 0.85 | 0.89 | 0.15 |
| C portion | 0.80 | 0.58 | 0.74 | 0.57 | 0.53 | 0.60 | 0.53 | 0.53 | 0.27 |
| D portion | 0.61 | 0.65 | 0.93 | 0.94 | 0.87 | 0.91 | 0.67 | 0.67 | 0.33 |
| E portion | 1.07 | 1.05 | 1.07 | 0.92 | 0.94 | 1.06 | 1.08 | 1.04 | 0.16 |
| F portion | 0.79 | 0.76 | 0.78 | 0.79 | 0.80 | 0.81 | 0.78 | 0.80 | 0.05 |
| Average of Differences in Wall Thickness | | | | | | | | | 0.18 |

TABLE 3

Example 1 Unit: mm

| Line Number | 1 | 2 | 3 | 4 | 5 | 6 | 7 | 8 | Difference in Wall Thickness in Circumferential Direction |
|---|---|---|---|---|---|---|---|---|---|
| A portion | 0.34 | 0.38 | 0.36 | 0.34 | 0.30 | 0.34 | 0.31 | 0.32 | 0.08 |
| B portion | 0.79 | 0.76 | 0.88 | 0.77 | 0.74 | 0.77 | 0.77 | 0.79 | 0.14 |
| C portion | 0.50 | 0.48 | 0.59 | 0.51 | 0.48 | 0.49 | 0.47 | 0.45 | 0.14 |
| D portion | 0.70 | 0.68 | 0.78 | 0.81 | 0.77 | 0.80 | 0.82 | 0.81 | 0.14 |
| E portion | 0.96 | 0.97 | 0.99 | 0.92 | 0.90 | 0.95 | 1.02 | 0.97 | 0.12 |
| F portion | 0.80 | 0.79 | 0.78 | 0.82 | 0.81 | 0.83 | 0.82 | 0.79 | 0.05 |
| Average of Differences in Wall Thickness | | | | | | | | | 0.11 |

15

TABLE 4

Example 2 Unit: mm

| Line Number | 1 | 2 | 3 | 4 | 5 | 6 | 7 | 8 | Difference in Wall Thickness in Circumferential Direction |
|---|---|---|---|---|---|---|---|---|---|
| A portion | 0.37 | 0.34 | 0.36 | 0.32 | 0.30 | 0.32 | 0.33 | 0.32 | 0.07 |
| B portion | 0.80 | 0.78 | 0.88 | 0.80 | 0.78 | 0.80 | 0.79 | 0.78 | 0.10 |
| C portion | 0.57 | 0.48 | 0.57 | 0.54 | 0.48 | 0.50 | 0.48 | 0.49 | 0.09 |
| D portion | 0.56 | 0.72 | 0.79 | 0.81 | 0.77 | 0.80 | 0.79 | 0.70 | 0.25 |
| E portion | 0.91 | 0.95 | 1.00 | 0.98 | 0.90 | 0.98 | 1.02 | 0.95 | 0.12 |
| F portion | 0.80 | 0.80 | 0.79 | 0.83 | 0.82 | 0.84 | 0.83 | 0.79 | 0.05 |
| Average of Differences in Wall Thickness | | | | | | | | | 0.11 |

TABLE 5

Example 3 Unit: mm

| Line Number | 1 | 2 | 3 | 4 | 5 | 6 | 7 | 8 | Difference in Wall Thickness in Circumferential Direction |
|---|---|---|---|---|---|---|---|---|---|
| A portion | 0.31 | 0.32 | 0.35 | 0.34 | 0.32 | 0.29 | 0.27 | 0.29 | 0.08 |
| B portion | 0.77 | 0.73 | 0.87 | 0.78 | 0.76 | 0.77 | 0.78 | 0.80 | 0.14 |
| C portion | 0.60 | 0.56 | 0.65 | 0.58 | 0.54 | 0.54 | 0.52 | 0.53 | 0.13 |
| D portion | 0.63 | 0.70 | 0.72 | 0.74 | 0.70 | 0.68 | 0.72 | 0.67 | 0.11 |
| E portion | 0.82 | 0.82 | 0.85 | 0.82 | 0.82 | 0.84 | 0.87 | 0.84 | 0.05 |
| F portion | 0.72 | 0.71 | 0.77 | 0.80 | 0.78 | 0.79 | 0.74 | 0.75 | 0.09 |
| Average of Differences in Wall Thickness | | | | | | | | | 0.10 |

TABLE 6

Example 4 Unit: mm

| Line Number | 1 | 2 | 3 | 4 | 5 | 6 | 7 | 8 | Difference in Wall Thickness in Circumferential Direction |
|---|---|---|---|---|---|---|---|---|---|
| A portion | 0.32 | 0.34 | 0.37 | 0.37 | 0.34 | 0.33 | 0.31 | 0.32 | 0.06 |
| B portion | 0.77 | 0.74 | 0.88 | 0.80 | 0.75 | 0.78 | 0.79 | 0.87 | 0.14 |
| C portion | 0.59 | 0.58 | 0.65 | 0.64 | 0.58 | 0.58 | 0.58 | 0.59 | 0.07 |
| D portion | 0.62 | 0.68 | 0.72 | 0.71 | 0.70 | 0.70 | 0.71 | 0.70 | 0.10 |
| E portion | 0.79 | 0.80 | 0.84 | 0.85 | 0.81 | 0.82 | 0.82 | 0.86 | 0.07 |
| F portion | 0.76 | 0.74 | 0.77 | 0.82 | 0.82 | 0.79 | 0.76 | 0.75 | 0.08 |
| Average of Differences in Wall Thickness | | | | | | | | | 0.09 |

TABLE 7

Example 5 Unit: mm

| Line Number | 1 | 2 | 3 | 4 | 5 | 6 | 7 | 8 | Difference in Wall Thickness in Circumferential Direction |
|---|---|---|---|---|---|---|---|---|---|
| A portion | 0.31 | 0.32 | 0.35 | 0.36 | 0.34 | 0.32 | 0.31 | 0.32 | 0.05 |
| B portion | 0.74 | 0.73 | 0.83 | 0.81 | 0.78 | 0.78 | 0.81 | 0.81 | 0.10 |
| C portion | 0.57 | 0.57 | 0.66 | 0.65 | 0.61 | 0.61 | 0.60 | 0.61 | 0.09 |
| D portion | 0.62 | 0.63 | 0.66 | 0.68 | 0.68 | 0.69 | 0.67 | 0.67 | 0.07 |
| E portion | 0.67 | 0.74 | 0.77 | 0.77 | 0.77 | 0.75 | 0.76 | 0.79 | 0.12 |
| F portion | 0.71 | 0.71 | 0.71 | 0.78 | 0.78 | 0.75 | 0.73 | 0.73 | 0.07 |
| Average of Differences in Wall Thickness | | | | | | | | | 0.09 |

"Difference in wall thickness in the circumferential direction" is described in the rightmost column of each table. Here, the "difference in wall thickness in the circumferential direction" indicates the difference in wall thickness of the A portions of the line numbers 1 to 8 (the value obtained by subtracting the minimum wall thickness from the maximum wall thickness of the A portions), the difference in wall thickness of the B portions of the line numbers 1 to 8, the difference in wall thickness of the C portions of the line numbers 1 to 8, the difference in wall thickness of the D portions of the line numbers 1 to 8, the difference in wall thickness of the E portions of the line numbers 1 to 8, and the difference in wall thickness of the F portions of the line numbers 1 to 8. The "average difference in wall thickness" shown at the bottom of each table corresponds to the average value of the difference in wall thickness in the circumferential direction corresponding to the A to F portions (the differences in wall thickness of the A to F portions are summed and divided by the number of measurement areas, i.e., 6 (the number of the A to F portions) to obtain the values).

As shown in Tables 1 and 2, the average difference in wall thickness in the circumferential direction in Comparative Examples 1 and 2 was about 0.2 mm. On the other hand, the average difference in wall thickness in the circumferential direction in Examples 1 to 5 was about 0.1 mm. That is, it was shown that the variation (uneven wall thickness) in the sample in the bottom circumferential direction using the refrigerant at 50° C. to 90° C. was smaller than that of the sample when using the refrigerant at 30° C. to 40° C. In particular, the average difference in wall thickness in the circumferential direction in Examples 3 to 5 was 0.1 mm or less, indicating that the variation in wall thickness (uneven wall thickness) in the bottom circumferential direction was even smaller.

REFERENCE SIGNS LIST 1 injection stretch blow molding machine
2 injection apparatus
3 injection molding section
4 blow molding section
5 ejection section
6 hollow molded article producing process
7 injection molding process
8 blow molding process
9 ejection process
10 injection molding mold
11 lower mold
12 rotary plate
13 lip mold
14 upper mold
15 preform
16 injection cooling process
17 preform conveyance process
18 blow molding mold
19 blow mold
20 stretching rod
21 blow core mold
22 supplying unit
23 tip
24 cooling unit
25 cooling circuit
26 rod support plate
27 mounting plate
28 rod body
29 inner passage
30 conduit

What is claimed is:

1. An injection stretch blow molding machine comprising:
an injection molding section in which an injection molding mold combines an upper mold, a lower mold, a rotary plate, and a lip mold, for use in injection molding a preform, the lip mold having a first portion and a second portion, the first portion of the lip mold being secured to the rotary plate and the second portion of the lip mold sized to be received within the lower mold,
a blow molding section that includes a stretching rod configured to stretch the preform which has been injection molded by the injection molding section, where a blow molding mold that combines a blow mold and the lip mold for blow molding a hollow molded article is disposed,
an ejection section configured to eject the hollow molded body molded in the blow molding section from the lip mold and discharging it outside the machine, wherein
the injection molding section, the blow molding section and the ejection section are arranged on a base, and
the hollow molded article manufacturing processes are performed simultaneously,
the injection molding section is a section configured to perform
an injection cooling process of allowing the preform to be brought into contact with the injection molding mold to solidify a surface layer of the preform, and
a preform conveyance process of releasing the preform, cooled by the injection cooling process, from the injection molding mold and conveying the preform, to the blow molding mold with the preform being in a state in which the surface layer of the preform is softened by receiving heat from an inner layer of the preform, the blow molding section is a section configured such that the preform released from the injection molding mold is disposed in the blow molding mold with the preform being in a state in which the surface layer of the preform is softened by receiving heat from an inner layer of the preform, and the stretching rod includes a cooling unit configured to cool a tip of the stretching rod, which is allowed to be in contact with a bottom of the preform, at a temperature ranging from 50° ° C. to 90° C. with the preform being conveyed from the injection molding mold to the blow molding mold in a softened state in which a temperature of the surface layer of the preform is raised by receiving the heat from an inner layer of the preform.

2. The injection stretch blow molding machine according to claim 1, wherein the tip of the stretching rod is cooled to a temperature ranging from 70° C. to 90° C.

* * * * *